(12) United States Patent
Martin et al.

(10) Patent No.: US 6,543,596 B2
(45) Date of Patent: Apr. 8, 2003

(54) MULTI-DISK FRICTION DEVICE HAVING LOW-DRAG CHARACTERISTICS

(75) Inventors: R. Keith Martin, Imlay City, MI (US); John M. Kremer, Sterling Heights, MI (US)

(73) Assignee: BorgWarner, Inc., Troy, MI (US)

(*) Notice: Subject to any disclaimer, the term of this patent is extended or adjusted under 35 U.S.C. 154(b) by 0 days.

(21) Appl. No.: 09/841,624

(22) Filed: Apr. 24, 2001

(65) Prior Publication Data

US 2002/0020601 A1 Feb. 21, 2002

Related U.S. Application Data

(60) Provisional application No. 60/199,243, filed on Apr. 24, 2000.

(51) Int. Cl.[7] ............... F16D 25/0638; F16D 13/69
(52) U.S. Cl. ............... 192/85 AA; 192/70.28; 188/71.5; 188/72.3
(58) Field of Search ............ 192/70.12, 70.28, 192/85 AA; 188/71.5, 72.3, 72.4

(56) References Cited

U.S. PATENT DOCUMENTS

| | | | | |
|---|---|---|---|---|
| 1,233,561 A | * | 7/1917 | Dornfeld | 192/70.28 X |
| 2,174,395 A | * | 9/1939 | Aikman | 188/72.3 X |
| 3,171,522 A | * | 3/1965 | Petrie et al. | 192/70.28 |
| 3,534,842 A | | 10/1970 | Davison, Jr. | 192/113 |
| 3,537,556 A | * | 11/1970 | Pfeffer et al. | 192/70.28 |
| 3,612,237 A | | 10/1971 | Honda | 192/85 |
| 3,654,692 A | | 4/1972 | Goetz | 29/558 |
| 3,834,503 A | | 9/1974 | Maurer et al. | 192/113 |
| 4,205,739 A | | 6/1980 | Shelby et al. | 192/113 |
| 4,219,246 A | | 8/1980 | Ladin | 308/219 |
| 4,270,647 A | | 6/1981 | Leber | 192/113 |
| 4,301,904 A | | 11/1981 | Ahlen | 192/70.12 |
| 4,372,434 A | | 2/1983 | Aschauer | 192/85 |

(List continued on next page.)

FOREIGN PATENT DOCUMENTS

| | | |
|---|---|---|
| DE | 871 857 | 3/1953 |
| DE | 31 18 565 A1 | 11/1982 |
| DE | 31 49 880 C2 | 7/1985 |
| DE | 35 32 759 C1 | 3/1987 |
| EP | 0762009 A1 | 3/1997 |
| EP | 0848179 A1 | 6/1998 |
| FR | 2123828 | 9/1972 |
| JP | 4-366032 A * 12/1992 | 192/70.28 |
| WO | WO 97/32678 | 12/1997 |
| WO | WO 99/45289 | 10/1999 |

*Primary Examiner*—Richard M. Lorence
(74) *Attorney, Agent, or Firm*—Bliss McGlynn, P.C.; Greg Dziegielewski

(57) ABSTRACT

A friction device includes drive and driven members rotatable about a common axis and defining a housing therebetween in which a piston assembly is supported and an expandable chamber is defined. A clutch pack is interposed between the drive and driven members and has separation plates interleaved with friction plates. The piston assembly is adapted to move among disengaged, pre-staged, and engaged positions wherein the friction plates are disposed in non-contacting, proximate contacting, and contacting relationship, respectively, with the separation plates. In the engaged position, the piston assembly is disposed forcing such contacting relationship to actuate the clutch pack to connect the drive and driven members. The clutch pack further has a separation device disposed between adjacent friction plates and adapted to bias the adjacent friction plates in opposite directions to facilitate non-contacting rotation of the adjacent friction plates when torque translation between the drive and driven members is interrupted.

13 Claims, 3 Drawing Sheets

U.S. PATENT DOCUMENTS

| | | | |
|---|---|---|---|
| 4,501,676 A | 2/1985 | Moorhouse | 252/12 |
| 4,548,306 A * | 10/1985 | Hartz | 192/70.28 |
| 4,667,534 A | 5/1987 | Kataoka | 74/711 |
| 4,667,798 A | 5/1987 | Sailer et al. | 192/70.12 |
| 4,700,823 A | 10/1987 | Winckler | 192/107 |
| 4,802,564 A * | 2/1989 | Stodt | 192/70.28 |
| 4,808,015 A | 2/1989 | Babcock | 384/609 |
| 4,827,784 A | 5/1989 | Muller et al. | 74/330 |
| 5,174,420 A | 12/1992 | DeWald et al. | 188/264 |
| 5,305,863 A | 4/1994 | Gooch et al. | 192/70.12 |
| 5,383,544 A * | 1/1995 | Patel | 192/70.28 |
| 5,469,943 A | 11/1995 | Hill et al. | 188/264 |
| 5,495,927 A | 3/1996 | Samie et al. | 192/70.12 |
| 5,538,121 A | 7/1996 | Hering | 192/70.12 |
| 5,577,588 A | 11/1996 | Raszkowski | 192/113.35 |
| 5,613,588 A | 3/1997 | Vu | 192/113.35 |
| 5,755,314 A | 5/1998 | Kanda et al. | 192/70.12 |
| 5,899,310 A | 5/1999 | Mizuta | 192/107 |
| 5,918,715 A | 7/1999 | Ruth et al. | 192/46 |
| 6,026,944 A * | 2/2000 | Satou et al. | 192/70.28 |
| 6,189,669 B1 * | 2/2001 | Kremer et al. | 192/70.12 |

* cited by examiner

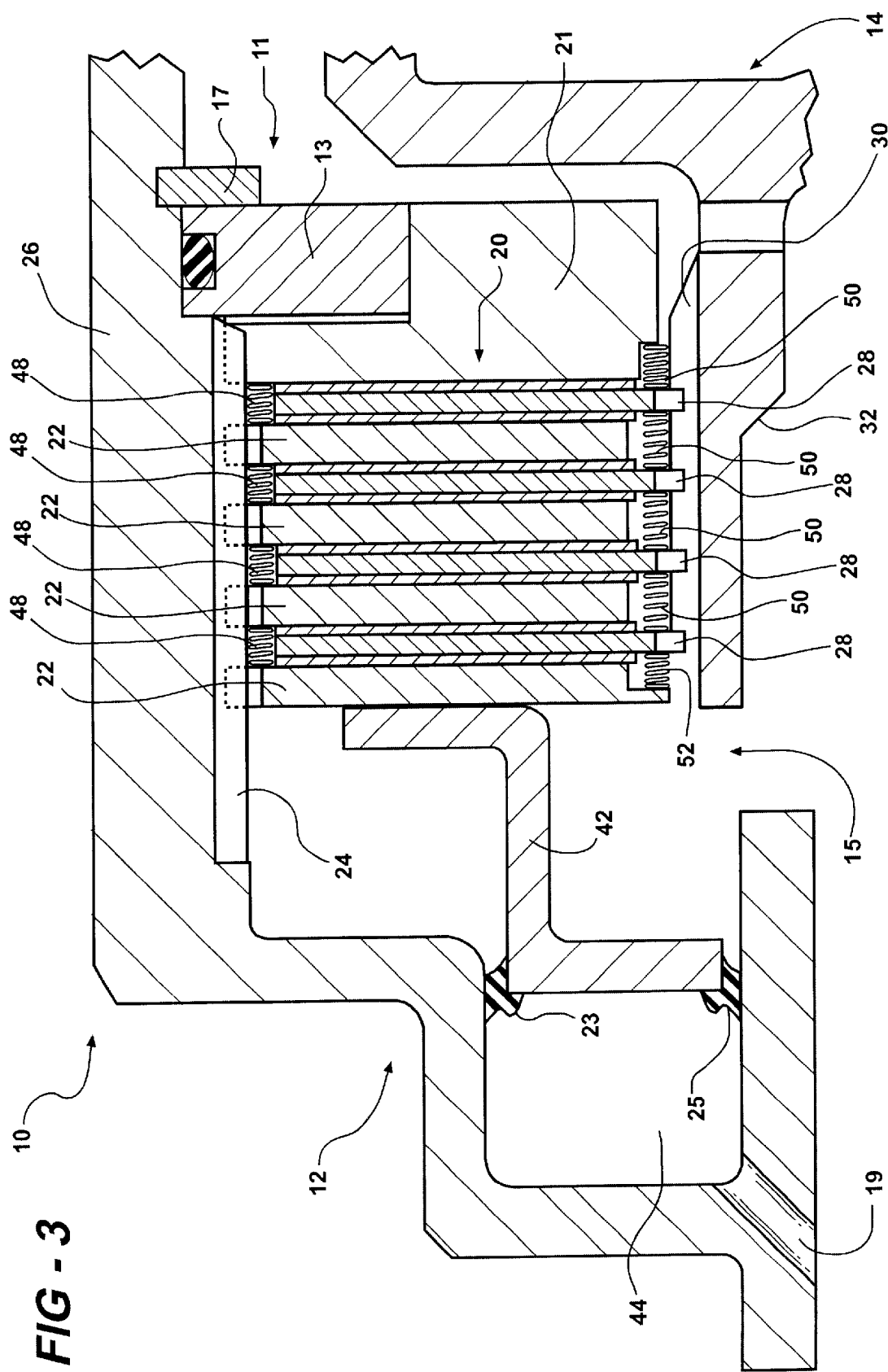

MULTI-DISK FRICTION DEVICE HAVING LOW-DRAG CHARACTERISTICS

This application claims the benefit of U.S. Provisional Application No. 60/199,243, filed Apr. 24, 2000.

BACKGROUND OF THE INVENTION

1. Field of the Invention

The present invention relates, generally, to friction devices, such as clutch or brake assemblies for use in transmissions, differentials, or brake systems. More specifically, the present invention relates to multi-disk clutch or brake assemblies having low-drag characteristics.

2. Description of the Related Art

Multi-disk friction devices are employed in a wide range of applications as clutch or brake assemblies. For example, such devices are frequently used in land-based vehicles. Generally speaking, these vehicles require three basic components—a power plant (such as an internal-combustion engine), a powertrain, and wheels. The powertrain's main component is typically referred to as a "transmission." Engine torque and speed are converted in the transmission in accordance with the tractive-power demand of a vehicle. The transmission includes one or more gear sets, which may include an inner sun-gear, intermediate planet gears that are supported by their carriers, and outer ring gears. Various components of the gear sets are held or powered to change gear ratios in the transmission. A multi-disk pack clutch is a friction device that is commonly employed as a holding mechanism in a transmission or a differential. In addition, multi-disk friction devices also find use in industrial applications, such as in wet-brake assemblies, to brake the wheels on earth-moving equipment.

The multi-disk pack clutch or the multi-disk brake assembly has a clutch sub-assembly that includes a set of plates and a set of friction disks. The plates are interleaved with the friction disks. The plates and the friction disks are bathed in a continual flow of lubricant and, in "open pack" operation, normally turn past one another without contact. The pack clutch or the brake assembly also typically includes a piston. When a component of a gear set is to be held, as, for example, during a particular gear range, a piston is actuated to cause the plates to come into contact with the friction disks. In certain applications, it is known to employ several multi-disk pack devices in combination to establish different drive connections throughout the transmission or differential to provide various gear ratios in operation or to brake a component.

When the friction disks are not engaged, there often remains a differential rotational speed between a drive member and a driven member that the clutch or the brake bridges. Relative contact between the plates and the friction disks during openpack mode creates drag. This condition reduces the efficiency of the transmission and, ultimately, results in lower fuel efficiency.

Accordingly, there remains a need in the art for a friction device that may be selectively engaged and disengaged and ensures separation between the plates and the friction disks when the clutch is in open-pack mode to reduce drag and improve fuel economy.

SUMMARY OF THE INVENTION

The present invention overcomes the disadvantages in the related art in a friction device that includes a drive member having a drive hub and a driven member having a driven hub. The drive and driven members are rotatable about a common axis and define a housing therebetween. A clutch pack is interposed between the drive and driven members, operable to connect and disconnect the drive and driven members for transferring and interrupting torque therebetween, and has aplurality of separation plates disposed on and rotatable with the drive hub and a plurality of friction plates disposed on and rotatable with the driven hub such that the plurality of separation plates is interleaved with the plurality of friction plates. A piston assembly is supported in the housing, defines an expandable chamber between the piston assembly and the housing, and is adapted to receive fluid under pressure.

The piston assembly is responsive to pressurized fluid in the expandable chamber to move among a disengaged position wherein the plurality of friction plates are disposed in non-contacting relationship with the plurality of separation plates, a pre-staged position wherein the plurality of friction plates are disposed in proximate contacting relationship with the plurality of separation plates, and an engaged position wherein the piston assembly is disposed to force the plurality of friction plates into contacting relationship with the plurality of separation plates so as to actuate the clutch pack to connect the drive and driven members. The clutch pack further has a separation device disposed between adjacent friction plates and adapted to bias the adjacent friction plates in opposite directions to facilitate non-contacting rotation of the adjacent friction plates when torque translation between the drive and driven members is interrupted.

In this way, the friction device of the present invention is adapted to use a long-travel arrangement of the piston assembly to provide an increased amount of running clearance when the friction device is in the low-drag mode. Also, prior to engagement, the piston assembly is adapted to be pre-staged to a position that allows a more normal running clearance so that the piston assembly is engagement-ready. Furthermore, the friction device is adapted to use positive mechanical separation of the separation and friction plates to ensure an air gap among all friction surfaces while the friction device is in the low-drag mode.

One advantage of the friction device of the present invention is the elimination or minimization of parasitic spin losses in a clutch assembly.

Another advantage of the friction device of the present invention is the reduction of drag in an automatic transmission incorporating the friction device.

Another advantage of the friction device of the present invention is the improvement in fuel economy of a vehicle incorporating the friction device.

Finally, these advantages are achieved in a friction device, such as a clutch assembly or a brake assembly, that is operationally efficient and cost-effective to manufacture relative to the complex systems proposed in the related art.

BRIEF DESCRIPTION OF THE DRAWINGS

Other advantages of the invention will be readily appreciated as the same becomes better understood by reference to the following detailed description when considered in connection with the accompanying drawings, wherein:

FIG. 3 is a partial cross-sectional side view illustrating the friction device of the present invention shown in FIG. 1, wherein the piston assembly of the clutch or brake assembly is engaged.

DETAILED DESCRIPTION OF THE PREFERRED EMBODIMENT

Figure 1:
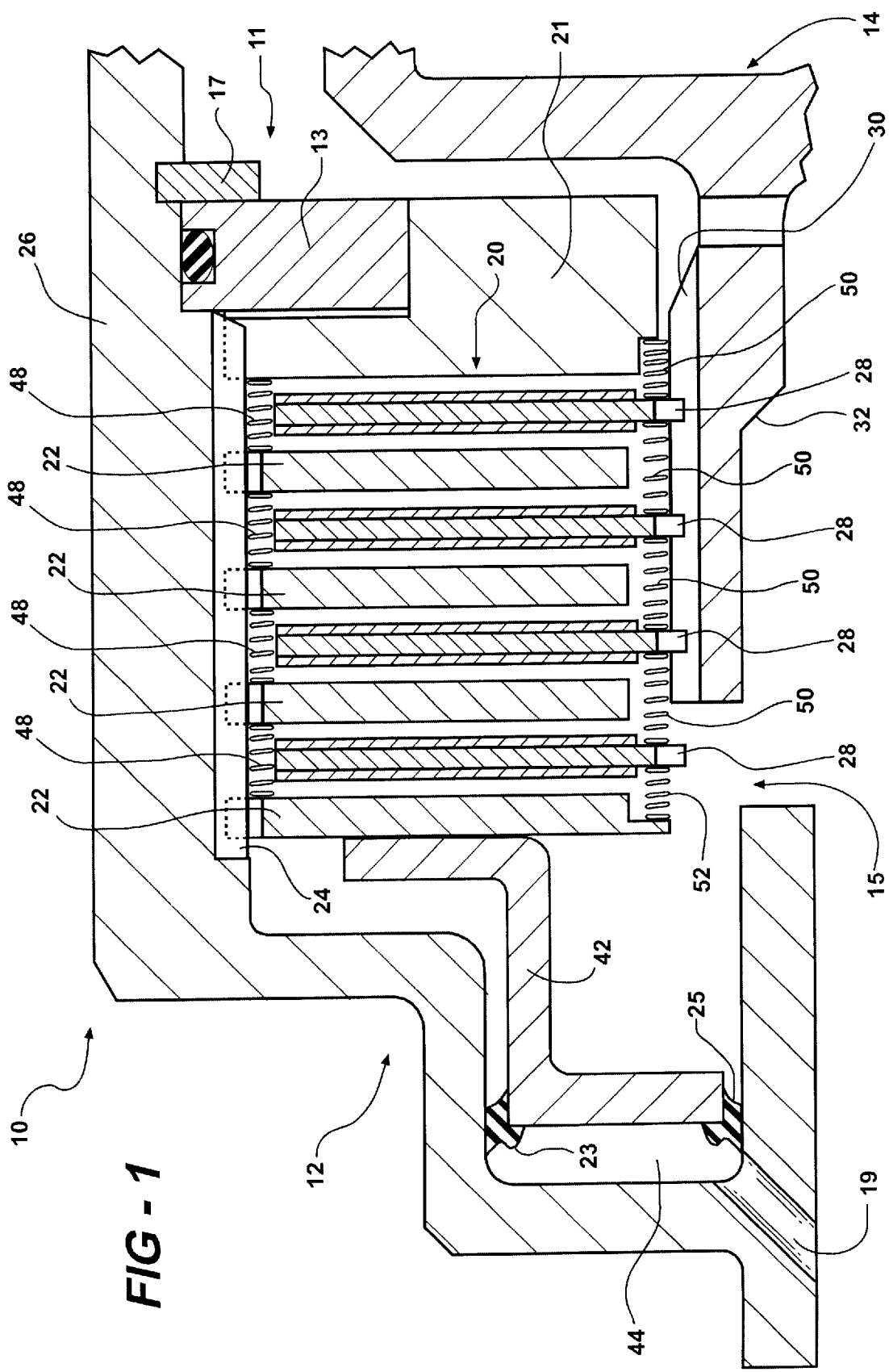
FIG. 1 is a partial cross-sectional side view illustrating the friction device of the present invention operating in an open-pack mode.

Referring now to FIG. 1, a friction device, such as a clutch assembly or a brake assembly, of the present invention is generally indicated at 10. The friction device 10 is adapted to be employed in connection with a transmission assembly, a differential, or a brake system. For example only and not by way of limitation, as is commonly known in the art, but not shown in the figures, a transmission assembly typically includes an input shaft that is operatively coupled to a prime mover, such as an internal-combustion engine. In an automotive application, the transmission assembly also includes an output shaft that is operatively coupled to driven wheels through other drivetrain components, such as a drive shaft and an axle having a differential. At least one gear set, and often a plurality of gear sets, is operatively coupled between the input and output shafts. A casing of the transmission assembly supports the input and output shafts and the gear sets of the transmission assembly.

Various components of the gear sets are held or powered to change the gear ratio in the transmission assembly. To this end, the transmission assembly will typically include at least one friction device 10. However, it will be appreciated by those having ordinary skill in the art that the transmission assembly may employ any number of friction devices adapted to hold or power the gear sets to change the gear ratio of the transmission assembly. Further, and notwithstanding the automotive-related context of the discussion above, from the description that follows, those having ordinary skill in the art will appreciate that the present invention may be employed in a transmission assembly, a differential, or a brake system whether used in an automotive, non-automotive, or industrial application. Thus, to the extent the term "clutch" is used below in any context, this term should be given its broadest possible meaning, including, but not limited to, clutches and brakes for use in transmission assemblies, differentials, or brake systems of all types.

In a preferred embodiment, the friction device 10 includes a drive member, generally indicated at 12, and a driven member, generally indicated at 14. The drive member 12 includes a drive hub 26 having splines 24 disposed thereon, and the driven member 14 includes a driven hub 32 having splines 30 disposed thereon. The drive and driven members 12,14, respectively, are rotatable about a common axis (not shown) and define a housing, generally indicated at 15. A thrust bearing (not shown) is often interposed between the drive and driven members 12, 14, respectively, to address axial loads that can stack-up among various components in the transmission assembly.

An annular clutch pack, one half of which is illustrated in the figures and generally indicated at 20, is interposed between the drive member 12 and the driven member 14 and operates to connect and disconnect the drive member 12 and the driven member 14 for transferring and interrupting torque therebetween. The clutch pack 20 includes a plurality of annular separation plates 22 disposed on and rotatable with the drive hub 12 and a plurality of annular friction plates 28 disposed on and rotatable with the driven hub 14 such that the plurality of separation plates 22 is interleaved with the plurality of friction plates 28. Specifically, each of the separation plates 22 is disposed on the splines 24, and each of the friction plates 28 is disposed on the splines 30. Also, the separation plates 22 define an outer diameter substantially at the splines 24, and the friction plates 28 define an inner diameter substantially at the splines 30.

In one disposition shown in FIG. 1, the separation plates 22 and the friction plates 28 rotate past one another in non-contacting relationship. This is known as "open pack" mode in a low-drag position. The separation plates 22 and the friction plates 28 are also axially movable relative to the drive and driven hubs 26, 32, respectively, such that the separation plates 22 and the friction plates 28 can come into frictional engagement with each other, thereby reducing or eliminating relative rotation between them. A pair of retaining ring assemblies (only one shown), generally indicated at 11, is also mounted to the drive hub 26 and disposed on opposite sides of the clutch pack 20 such that the clutch pack is sealed when the piston assembly is in the engaged state. As illustrated for example purposes only, the retaining ring assemblies 11 may include an O-ring gland 13 and a snap ring 17 such that the clutch pack 20 is sealed at the outer diameter when the separation plates 22 and the friction plates 28 are engaged. A backing plate 21 is also disposed between the drive and driven hubs 26, 32, respectively, adjacent the clutch pack 20 opposite the piston assembly 42.

The axial movement is achieved through the actuation of a piston assembly, generally indicated at 42, supported in the housing 15, defining an expandable chamber 44 between the piston assembly 42 and the housing 15, and adapted to receive fluid under pressure. A source of pressurized fluid (not shown) is in communication with the expandable chamber 44 via an inlet port 19. An upper seal 23 and a lower seal 25 are operatively connected to the piston assembly 42 and adapted to prevent fluid communication between the expandable chamber 44 and the remainder of the housing 15. The piston assembly 42 is responsive to the pressure of fluid in the expandable chamber 44 as will be described in greater detail below.

The piston assembly 42 is responsive to pressurized fluid in the expandable chamber 44 to move among disengaged (FIG. 1), pre-staged (FIG. 2), and engaged (FIG. 3) positions. In the disengaged position, the plurality of friction plates 28 are disposed in non-contacting relationship with the plurality of separation plates 22. In the pre-staged position, the plurality of friction plates 28 are disposed in proximate contacting relationship with the plurality of separation plates 22. As used herein, the term "proximate contacting relationship" means that adjacent separation and friction plates 22, 28, respectively, are disposed very close together and may even be in contacting relationship with respect to each other but without sufficient force to transfer torque at any operationally acceptable levels for the clutch or brake. In the engaged position, the piston assembly 42 is disposed to force the plurality of friction plates 28 into contacting relationship with the plurality of separation plates 22 so as to actuate the clutch pack 20 to connect the drive and driven members 12, 14, respectively.

A biasing member (not shown), such as a coiled spring, may be employed to move the piston assembly 42 to its disengaged position. It will be appreciated by those having ordinary skill in the art that the roles of the expandable chamber 44 and biasing member may be reversed such that the biasing member is employed to engage the clutch pack 20. Further, it will also be appreciated that the biasing member may include any biasing mechanism conventionally known in the art and is not limited to a coiled spring.

As alluded to above, just before the clutch pack 20 is engaged, the separation plates 22 and the friction plates 28 come into frictional contact with one another until the relative rotational speed between the separation plates 22 and the friction plates 28 becomes zero. In this disposition, the separation plates 22 and the friction plates 28 are either rotating together at a certain speed or both held against rotation, depending upon the particular application in a transmission, differential, or brake system.

The clutch pack 20 further includes a separation device 50 disposed between adjacent friction plates 28. The separation device 50 is adapted to bias the adjacent friction plates 28 in opposite directions to facilitate non-contacting rotation of the adjacent friction plates 28 when torque translation between the drive and driven members 12, 14, respectively, is interrupted.

The clutch pack 20 may also include a separation device 48 disposed between adjacent separation plates 22. The separation device 48 is adapted to bias the adjacent separation plates 22 in opposite directions to facilitate non-contacting rotation of the adjacent separation plates 22 when torque translation between the drive and driven members 12, 14, respectively, is interrupted.

Additionally, the clutch pack 20 may include a separation device 52 disposed between adjacent friction and separation plates 22, 28, respectively. The separation device 52 is adapted to bias the adjacent friction and separation plates 22, 28, respectively, in opposite directions to facilitate non-contacting rotation of the adjacent friction and separation plates 22, 28, respectively, when torque translation between the drive and driven members 12, 14, respectively, is interrupted.

Each of the separation devices 48, 50, 52 disposed between the adjacent friction plates 28, the adjacent separation plates 22, and the adjacent friction and separation plates 22, 28, respectively, is a biasing member 48, 50, 52. Specifically, each biasing member 48, 50, 52 is a spring 48, 50, 52. However, those having ordinary skill in the art will appreciate that the separation devices 48, 50, 52 may be formed using any suitable biasing mechanism.

A longer piston stroke may be required to ensure that the separation plates 22 and the friction plates 28 avoid unwanted contact with each other during open-pack mode. In some applications, the longer piston stroke increases the response time of the piston assembly 42 and is undesirable. In these cases, clutch logic can be added through electronic controls to pre-stage the piston assembly 42, effectively decreasing the stroke of the piston assembly 42 and, thereby, preparing the piston assembly 42 for engagement.

From the pre-staged position, the piston assembly 42 has a more traditional stroke length. Thus, the piston assembly 42 has a low-drag position (FIG. 1), a pre-staged position (FIG. 2), and an engaged position (FIG. 3).

Figure 2:
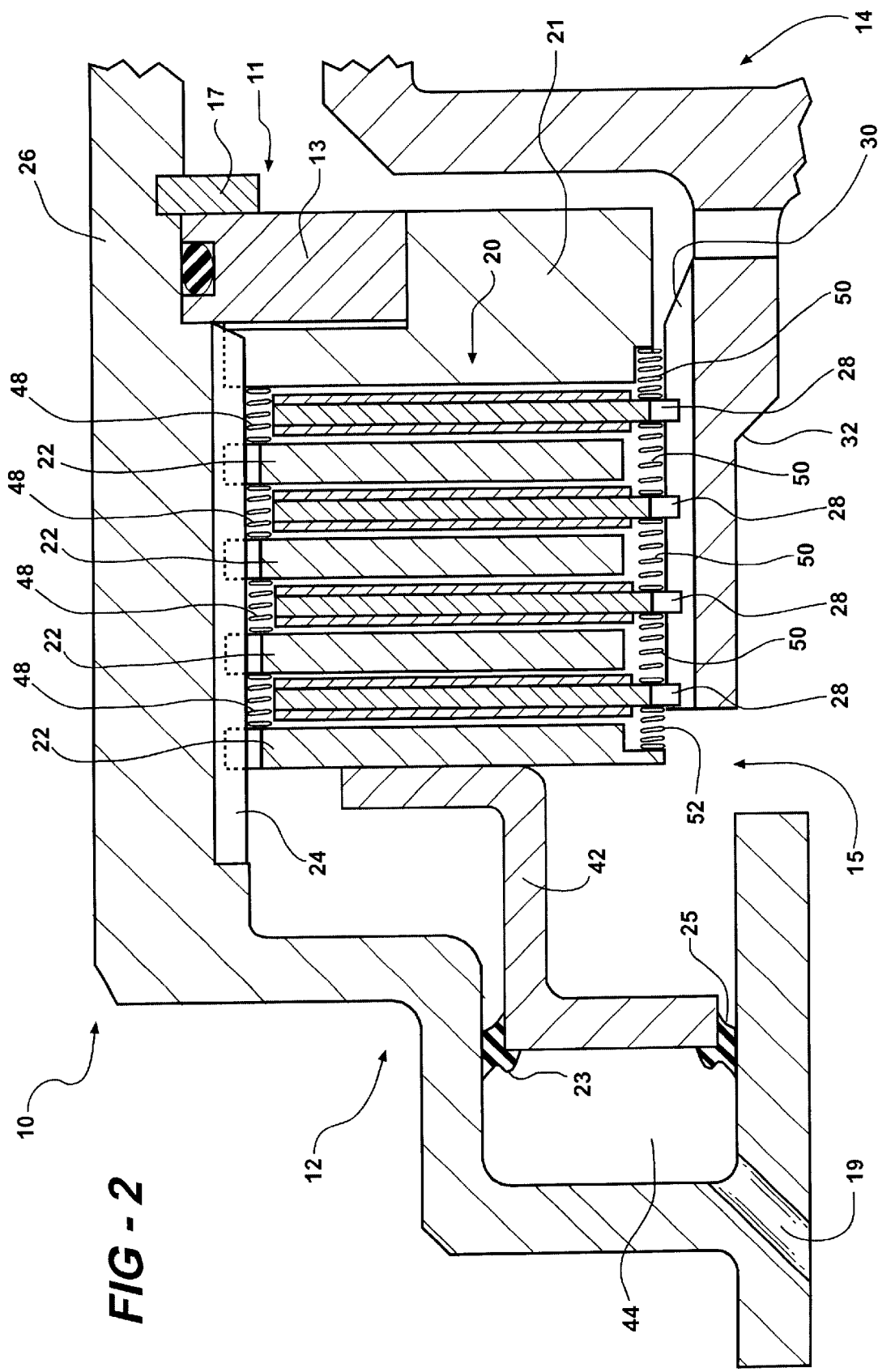
FIG. 2 is a partial cross-sectional side view illustrating the friction device of the present invention shown in FIG. 1, wherein the piston assembly of the clutch or brake assembly is pre-staged.

In this way, the friction device 10 is adapted to use a long-travel piston assembly 42 arranged to provide an increased amount of running clearance when the friction device 10 is in the low-drag mode. Also, as illustrated in FIG. 2, prior to engagement, the piston assembly 42 is adapted to be pre-staged to a position that allows a more normal running clearance so that the piston assembly 42 is engagement-ready. Furthermore, the friction device 10 is adapted to use positive mechanical separation of the separation plates 22 and the friction plates 28 to ensure an air gap between all friction surfaces while the friction device 10 is in the low-drag mode.

The friction device 10 eliminates or minimizes parasitic spin losses in a friction clutch, reduces drag in an automatic transmission, and improves the fuel economy of a vehicle. In addition, the friction device 10 is efficient and cost-effective to manufacture relative to the complex systems proposed in the related art.

The invention has been described in an illustrative manner. It is to be understood that the terminology used is intended to be in the nature of words of description rather than of limitation. Many modifications and variations of the invention are possible in light of the above teachings. Therefore, within the scope of the appended claims the invention may be practiced other than as specifically described.

We claim:

1. A friction device comprising:

a drive member including a drive hub and a driven member including a driven hub, said drive and driven members rotatable about a common axis and defining a housing therebetween;

a clutch pack interposed between said drive and driven members, operable to connect and disconnect said drive and driven members for transferring and interrupting torque therebetween, and including a plurality of separation plates disposed on and rotatable with said drive hub and a plurality of friction plates disposed on and rotatable with said driven hub such that said plurality of separation plates is interleaved with said plurality of friction plates;

a piston assembly supported in said housing, defining an expandable chamber between said piston assembly and said housing, and adapted to receive fluid under pressure;

said piston assembly being responsive to pressurized fluid in said expandable chamber to move among a disengaged position wherein said plurality of friction plates are disposed in non-contacting relationship with said plurality of separation plates, a pre-staged position wherein said plurality of friction plates are disposed in proximate contacting relationship with said plurality of separation plates, and an engaged position wherein said piston assembly is disposed to force said plurality of friction plates into contacting relationship with said plurality of separation plates so as to actuate said clutch pack to connect said drive and driven members; and said clutch pack further including a separation device disposed between adjacent friction plates and adapted to bias said adjacent friction plates in opposite directions, and a separation device disposed between adjacent friction and separation plates and adapted to bias said adjacent friction and separation plates in opposite direction, said separation devices acting to facilitate non-contacting rotation of said adjacent friction plates as well as adjacent friction and separation plates when torque translation between said drive and driven members is interrupted.

2. A friction device as set forth in claim 1, wherein said clutch pack further includes a separation device disposed between adjacent separation plates and adapted to bias said adjacent separation plates in opposite directions to facilitate non-contacting rotation of said adjacent separation plates when torque translation between said drive and driven members is interrupted.

3. A friction device as set forth in claim 2, wherein said separation device disposed between adjacent separation plates is a biasing member.

4. A friction device as set forth in claim 3, wherein said biasing member is a spring.

5. A friction device as set forth in claim 1, wherein said separation device disposed between adjacent friction plates is a biasing member.

6. A friction device as set forth in claim 5, wherein said biasing member is a spring.

7. A friction device as set forth in claim 1, wherein said separation device disposed between adjacent friction and separation plates is a biasing member.

8. A friction device as set forth in claim 7, wherein said biasing member is a spring.

9. A friction device as recited in claim 1, wherein said drive hub includes splines disposed thereon.

10. A friction device as recited in claim 9, wherein each of said plurality of separation plates is disposed on said splines of said drive hub.

11. A friction device as recited in claim 1, wherein said driven hub includes splines disposed thereon.

12. A friction device as recited in claim 11, wherein each of said plurality of friction plates is disposed on said splines of said driven hub.

13. A friction device comprising:
   a drive member including a drive hub and a driven member including a driven hub, said drive and driven members rotatable about a common axis and defining a housing therebetween;
   a clutch pack interposed between said drive and driven members, operable to connect and disconnect said drive and driven members for transferring and interrupting torque therebetween, and including a plurality of separation plates disposed on and rotatable with said drive hub and a plurality of friction plates disposed on and rotatable with said driven hub such that said plurality of separation plates is interleaved with said plurality of friction plates;
   a piston assembly supported in said housing, defining an expandable chamber between said piston assembly and said housing, and adapted to receive fluid under pressure;
   said piston assembly being responsive to pressurized fluid in said expandable chamber to move among a disengaged position wherein said plurality of friction plates are disposed in non-contacting relationship with said plurality of separation plates, a pre-staged position wherein said plurality of friction plates are disposed in proximate contacting relationship with said plurality of separation plates, and an engaged position wherein said piston assembly is disposed to force said plurality of friction plates into contacting relationship with said plurality of separation plates so as to actuate said clutch pack to connect said drive and driven members; and
   said clutch pack further including a separation device disposed between adjacent friction plates and adapted to bias said adjacent friction plates in opposite directions, a separation device disposed between adjacent separation plates and adapted to bias said adjacent separation plates in opposite directions, and a separation device disposed between adjacent friction and separation plates and adapted to bias said adjacent friction and separation plates in opposite directions to facilitate non-contacting rotation of said adjacent friction plates, said adjacent separation plates, and said adjacent friction and separation plates when torque translation between said drive and driven members is interrupted.

\* \* \* \* \*